US005499062A

United States Patent [19]

Urbanus

[11] Patent Number: 5,499,062

[45] Date of Patent: Mar. 12, 1996

[54] MULTIPLEXED MEMORY TIMING WITH BLOCK RESET AND SECONDARY MEMORY

[75] Inventor: Paul M. Urbanus, Dallas, Tex.

[73] Assignee: Texas Instruments Incorporated, Dallas, Tex.

[21] Appl. No.: 264,387

[22] Filed: Jun. 23, 1994

[51] Int. Cl.[6] .......... H04N 5/74

[52] U.S. Cl. .......... 348/771; 348/718; 348/759; 345/84

[58] Field of Search .......... 348/571, 718, 348/761, 762, 764, 759, 766, 771; 345/84, 85, 86; H04N 5/74

[56] References Cited

U.S. PATENT DOCUMENTS

| | | | |
|---|---|---|---|
| 4,039,890 | 8/1977 | Bailey et al. | 345/82 |
| 4,495,492 | 1/1985 | Anderson et al. | 345/86 |
| 4,638,309 | 1/1987 | Ott | 345/84 |
| 5,278,652 | 1/1994 | Urbanus et al. | 348/571 |
| 5,339,116 | 8/1994 | Urbanus et al. | 348/771 |

*Primary Examiner*—James J. Groody
*Assistant Examiner*—Jeffrey S. Murrell
*Attorney, Agent, or Firm*—Julie L. Reed; James C. Kesterson; Richard L. Donaldson

[57] ABSTRACT

A spatial light modulator array with adaptable multiplexed memory architecture. The modulator has an array of individually controllable pixels, where a predetermined number of pixels are assigned to a memory cell (16). The memory cell receives data from an input bus (14). On a signal (22), the memory cell transfers its data to a secondary memory (18), and to the activation circuitry (20) of one of its assigned pixels. On a second signal, the pixel responds to the data on the activation circuitry. When the display time of the data is less than the load time for the memory cell, the secondary memory is set with a second signal (24) so as to make the pixel dark and another control signal makes the pixels respond to the memory. In this way, the load time is lengthened and the data rate remains relatively low, even though the number of bits of intensity may not be the same as the number of bits of intensity used to determine the number of pixels assigned to each memory cell.

7 Claims, 2 Drawing Sheets

FIG. 3A
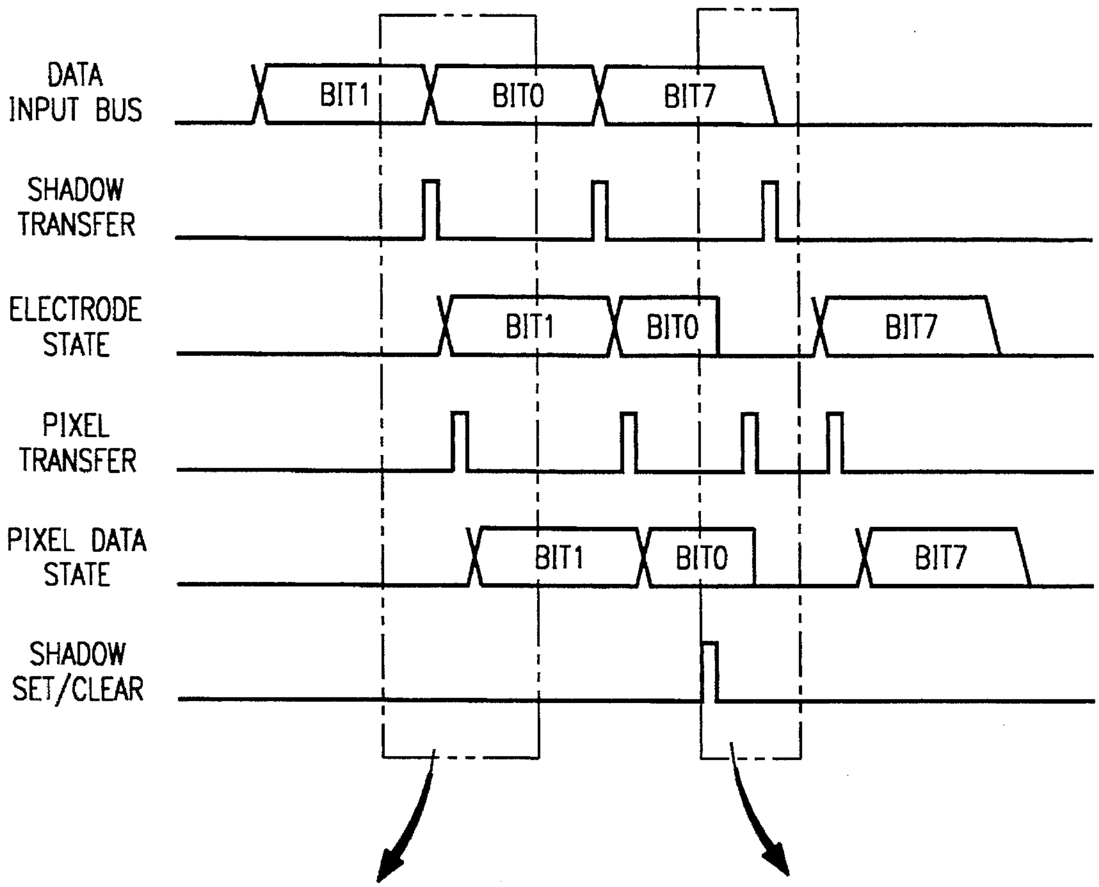
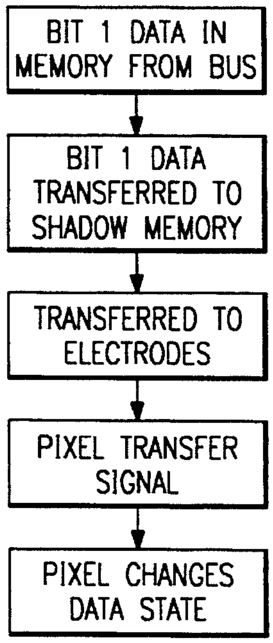
FIG. 3B
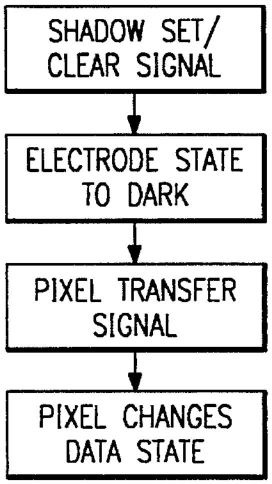
FIG. 3C

MULTIPLEXED MEMORY TIMING WITH BLOCK RESET AND SECONDARY MEMORY

BACKGROUND OF THE INVENTION

1. Field of the Invention

This invention relates to spatial light modulators, more particularly to memory schemes supporting spatial light modulator arrays.

2. Background of the Invention

In one form, spatial light modulators consists of an array of individually addressable elements, such as liquid crystal display panels or digital micromirror devices. These examples of modulator arrays have many uses, such as printers, displays, and optical processing. This discussion will focus on display systems.

In some applications, these arrays function in binary mode, where each individual element receives either an ON or an OFF signal. Typically, the elements, or pixels, of the array that receive the ON signal form the image the viewer receives, either directly, from a screen or through optics.

To individually address each pixel, each modulator array must have circuitry allowing signals to reach each pixel and activate it to respond in a certain way. One approach requires one memory cell per pixel, where the memory cell receives the information for the pixel's next state. This information results from the scheme used to produce the displayed images.

One technique for production of images, called pulse width modulation, has each pixel turn ON and OFF repeatedly within a video frame time. This method controls the intensity of a given pixel by how many times within the frame the pixel is ON, or transmitting light to the final image. Digitally, gray levels are achieved by using weighted bits of data.

For example, to achieve 16 gray levels, each pixel receives 4 bits of data over the time period of one frame. The frame time is divided into 15 slices, 1–15. The most significant bit (MSB) would then receive 8 of those time slices for it to display its data. The next most significant bit would receive 4, etc. Techniques exist that allow these time slice to be assigned to the bits of data in non-contiguous sections. For example, the MSB may be displayed for 2 time slices at once, then be displayed for the other 6 time slices at another time, or even be divided up again. A detailed description of this method using the DMD as an example is in U.S. Pat. No. 5,278,652, "DMD Architecture and Timing for Use in a Pulse-Width Modulated Display System."

The above technique requires memory for keeping the data to be displayed and sending it to the pixel at the appropriate time. One technique uses one memory cell per pixel. The cell receives the pixel's data, the pixel gets a control signal allowing it to react to the new data is latched into its new state. Meanwhile, the cell is receiving the data for the pixel's next state. When the pixel transfer signal occurs, the pixel reacts to its new data.

The above described method focuses on an entire array receiving the pixel transfer signal at once. However, techniques exist that allow any one pixel to receive the transfer signal by itself. This allows for a much lower data rate making the system much more manageable. One such method is discussed in U.S. patent application Ser. No. 08/002,627, "Pixel Control Circuitry for Spatial Light Modulator."

This particular technique, often referred to as split reset, uses less than one memory cell per pixel, with tile number of pixels per memory cell called "fanout." This architecture will be referred to more accurately as a multiplexed memory architecture. The memory cell receives the data for a set of pixels, rather than just one. To have the peak data rate most closely match the average data rate, the fanout is calculated as:

$$FANOUT_{max} = \frac{2^n - 1}{n},$$

where n=the number of bits of intensity. Therefore, if 4 bits of intensity were desired, there would be a fan out of $2^4-1$, or 15, divided by 4, equalling 3.75 pixels. Since fractional pixels are impossible, there would be 4 pixels per memory cell.

One problem with the above approach is that the number of levels of intensity is linked to the number of pixels per memory cell. The number of pixels per memory cell must be determined before the device is fabricated. Using a device with a set fanout for a different number of bits of intensity increases the data rate, which eliminates the main advantage of using multiplexed memory architecture.

Therefore, if the number of levels of intensity is different, different devices need to be fabricated to keep system costs down. A need exists for a method that makes the multiplexed memory architecture scheme more flexible and eliminates the need for specially fabricated devices.

SUMMARY OF THE INVENTION

An aspect of the invention is a spatial light modulator with an array of individually addressable pixels. Each pixel may be set and reset in response to a signal delivered to the pixel. A pixel consists of an active area, whether reflective or transmissive, and activation circuitry. The signals are passed to the pixels via a memory cell, with more than one pixel receiving from any one memory cell. The number of pixels in connection with a memory cell is decided before device fabrication, depending upon the number of bits of intensity.

One aspect of the invention allows a device fabricated with a set number of pixels per memory cell to be used for several applications while minimizing the increase in the peak data rate. The same device could be used for two systems where each system uses a different number of bits of intensity, regardless of the fixed fanout of the device.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 3*a*–3*c* shows the timing diagram for a multiplexed memory architecture memory cell with a shadow cell and its assigned pixel elements.

DETAILED DESCRIPTION OF THE PREFERRED EMBODIMENTS

Figure 1:
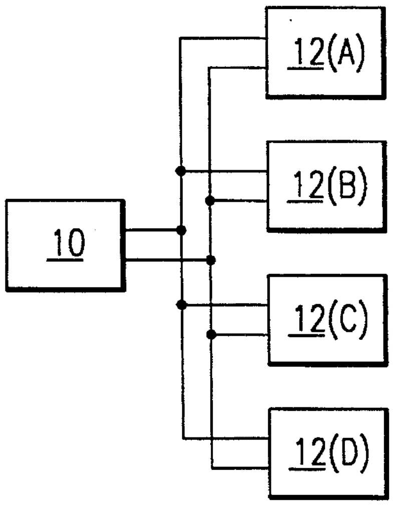
FIG. 1 shows a block diagram example of a multiplexed memory architecture memory cell and its assigned pixel elements.

Binary spatial light modulators are modulators with arrays of individually addressable pixels which have either an ON or OFF state. Examples are liquid crystal displays (LCD), digital micromirror devices (DMD), and actuated mirror arrays (AMA). One method of addressing binary spatial light modulators is pulse-width modulation (PWM). An incoming video data stream is digitized if necessary, and then passed to some type of memory. The memory stores the data stream by video frames. A given pixel on the array has a data in that video frame set specifically for that pixel. The size of the data set depends on the number of bits of intensity the system uses. If the system used 8 bits of intensity, there would be 8 bits of data for each pixel.

Giving each bit a binary weight achieves the gray levels. For example, for an 8-bit system, there are 256 gray levels, 255 of which are non-zero. In order for PWM to achieve 256 gray levels, the frame time is divided into 255 time slices. The most significant bit (MSB) receives 128 of these time slices for its display time. Display time means the time that a pixel is reacting to a given bit of data while receiving illumination. The data for that bit of significance may have one pixel in the ON position and another in the OFF position. The pixels assume either the ON or OFF positions depending upon the data on their activation circuitry. For the DMD and the LCD, the activation circuitry normally consists of at least one electrode. For the AMA, the activation circuitry typically consists of piezo-electric crystals. Additionally, capacitors that can be charged and discharged can be used.

The next MSB would then receive 64 time slices, and so on until the least significant bit (LSB) receives one time slice. There are varying methods and ways of loading the data and displaying it, which are described in the previously mentioned patent, U.S. Pat. No. 5,278,652, "DMD Architecture and Timing for Use in a Pulse-Width Modulated Display System," which is incorporated by reference herein.

In the above type of scheme, the load time must equal one time slice. Since the LSB receives only one time slice, it is more common to refer to these time slices as the LSB time. After the pixels receive their data, they are latched into position for the appropriate number of LSB times. This allows the next bit of data to be loaded into the memory cell attached to each pixel. If the PWM scheme was very simple, and each bit was loaded in sequence MSB to LSB for one frame, the MSB of the next frame must be loaded in the LSB display time for the previous frame. Therefore, the load time must equal the LSB time.

This leads to extremely high burst data rates. If the array were 2048x1152, there would be 2,359,296 pixels that would have to be loaded in one LSB time. The LSB time can be calculated as follows:

$$LSB = \frac{1}{F} * \frac{1}{R} * \frac{1}{2^{I} - 1}$$

where F equals the frame time of 30 frames per second, R is the number of colors per frame, and 1 is the number of integer bits of intensity (for a 256-level system, I=8).

The number of colors per frame depends on the system configuration. If the system has one spatial light modulator, for a full-color system it would need to have colored filters or something equivalent to color the light illuminating the modulator. Therefore, there would have to be 3 colors per frame. This would require that the PWM scheme discussed above to be implemented 3 times per frame, once for each color. The LSB time would then be 1/30*1/3*1/255=43.5 µseconds. 2,359,296 pixels must be loaded. Another configuration would have 3 spatial light modulators, with each one dedicated to a certain color, reducing the number of colors per frame for each device to 1. This would have a frame time of 130.5 µseconds.

The data rate is calculated as follows:

$$\text{Data rate} = \frac{R*C}{LSB \text{ time}}$$

where R is the number of rows, and C is the number of columns. The data rate for the above system would then be (2048*1152)/43.5 µseconds, or 54.2 gigabits per second.

Adjustments can be made to lower the data rate, such as using two column drivers for each column, cutting the data rate in half. If the device used has 128 input pins, the columns could be grouped together to use a shift register that would allow the data rate to again be cut by however wide each shift register is. One of the advantages of multiplexed memory architecture is that it cuts the number of memory cells to be loaded in an LSB time, thereby reducing the peak data rates dramatically.

However, the biggest disadvantage of using multiplexed memory architecture is that the fanout, $$FANOUT_{max} = \frac{2^n - 1}{n},$$

where n is the number of bits of intensity, is set for each device before fabrication for minimizing the input data rate. An example of a multiplexed memory architecture memory cell 10, and its assigned pixel elements 12*a*, 12*b*, 12*c*, and 12*d*, is shown in FIG. 1. The embodiment shown is for a fanout of 4 (a 4-bit system), where fanout is the number of pixels per memory cell. To use a device that has a set fanout for another application with a different intensity level increases the peak data rate. The increase is determined by the fanout of the new level divided by the fanout of the device, times the data rate of the device when it used the appropriate levels of intensity for its fanout.

For example, a chip with a data rate of 10.9 MHz and a fanout of 11 (the fanout of 64 intensity levels is 10.5, rounded up) could be used for a system requiring 256 intensity levels. The optimal fanout for a device of 256 intensity levels (255 plus the OFF state) is $2^8-1$, or 255, divided by 8, equalling 31. The new data rate then would be 31 (new fanout)/11 (old fanout) times 10.9 MHz, which equals 30.7 MHz. Looking at other calculations in the table below, it is easy to see why the use of a device with a set fanout is not practical for other applications.

TABLE I

Data rates for devices with other than optimal fanout.

| # of bits | Optimal fanout | Optimal fanout data rate | New data rate Fanout = 11 |
|---|---|---|---|
| 8 | (255-1)/8 = 31 | 27.3 MHz | 76.9 MHz |
| 9 | (512-1)/9 = 57 | 30.3 MHz | 157.0 MHz |
| 10 | (1024-1)/10 = 102 | 33.3 MHz | 308.8 MHz |

Fanout of device = 11 (64 intensity levels)
New data rate = (Optimal fanout/fanout of device) × Optimal fanout data rate
1 spatial light modulator 2048 × 1152 with a 180 Hz input rate
128 input pins However, with an implementation of extra circuitry between the memory cell and the pixels assigned to it, it is possible to for a device with a set fanout to be used in new applications without such a dramatic increase in the data rate. One example of this is shown in FIG. 2, which is easier to understand when taken with the timing diagram of FIG. 3*a*.

Figure 2:
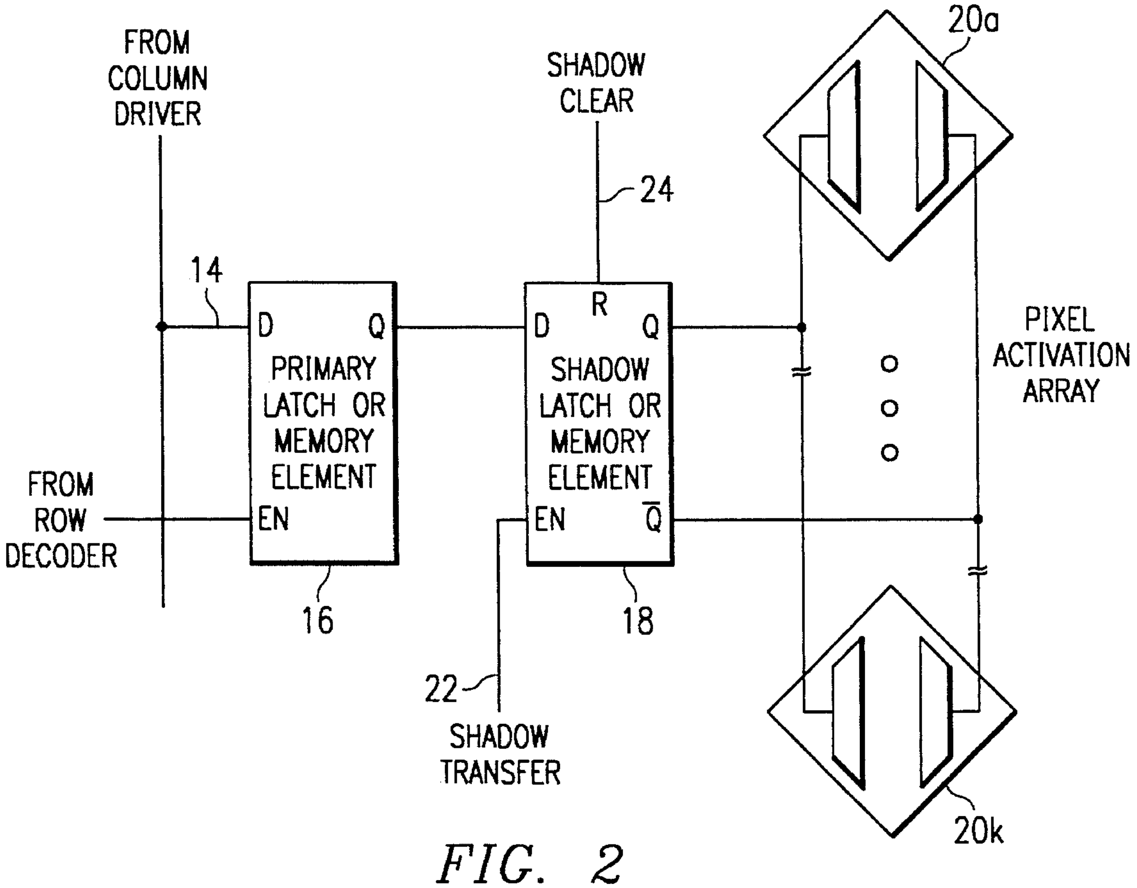
FIG. 2 shows a block diagram example of a multiplexed memory architecture memory cell with a shadow cell and its assigned pixel elements.

In FIG. 2, the data input bus 14 transfers data for bit 1 (next to LSB) to the primary memory cell or data latch 16. This is seen on the first line of the timing diagram in FIG.

3*a*. After the bit 1 is loaded into all of the respective respective memory cells, two control signals occur. First, shown on the second line of FIG. 3*a* is the shadow transfer signal (22). This transfers the data from the primary memory cell to its secondary or shadow memory cell (18). For illustration, this is assumed to be a data latch, but could comprise any type of circuit that can store data and be cleared. This also transfers the data onto the electrodes or other activation circuitry of pixels 20*a*–20*k* (for a fanout of 11). The electrode state is shown on the third line of FIG. 3*a*. The second control signal is the pixel transfer signal, shown on the fourth line of FIG. 3*a*. The pixels then adjust to display bit 1 data in response to the pixel transfer signal, shown in the fourth line of FIG. 3*a*. A flow chart process for the sequencing of the transfer signals and movement of the data at the area surrounded by the dashed line is shown in FIG. 3*b*.

The same process repeats for bit 0, which is the LSB. However, the shadow memory is cleared separate from the secondary memory, with a signal (24) as shown on the sixth line of FIG. 3*a*. This sets the pixel to the OFF state when the pixel transfer signal is applied. In this case, the timing of the shadow clear and pixel transfer signal is such that the display time for bit 0 is one-half of the display time for bit 1. The flow chart for this are of the timing diagram, surrounded by a second dashed line is shown in FIG. 3*c*.

By clearing the secondary memory during the LSB's display time, it gives more time for the device to be loaded than the LSB display time. Bit 0 is described as a clearable bit, which means that it's display time is less than the load time. For example, if bit 0, the LSB were cleared after its usual display time, and the next shadow transfer signal did not come for another LSB time, the load time of the device has effectively been doubled. Instead of having to load the device in 1/255th of a frame, the device could be loaded in 1/128th of a frame.

This procedure ties into multiplexed memory architecture by identifying the bits differently. Instead of n bits of intensity, there are now two types of bits: I bits, which are the integral bits whose load time is less than or equal to their display time; and C bits, which are the clearable bits. The calculation for fanout then becomes:

$$Fanout = \frac{2^I - 1 + C}{I + C}.$$

This lowers the ratio used in Table I to calculate the new data rate for a device with other than optimal fanout. The following table shows the number of bits of intensity for a system and the effective bits.

TABLE II

Data rates for devices using clearable bits.

| # of bits | Effective bits | Optimal fanout | Optimal fanout data rate | New data rate Fanout = 11 |
|---|---|---|---|---|
| 8 | 8 | 31 | 27.3 MHz | 76.9 MHz |
| 7+1 | 8 | 16 | 26.5 MHz | 38.6 MHz |
| 9 | 9 | 56 | 30.3 MHz | 154.3 MHz |
| 7+2 | 9 | 14 | 30.5 MHz | 38.8 MHz |
| 8+1 | 9 | 28 | 30.3 MHz | 77.1 MHz |
| 10 | 10 | 102 | 33.3 MHz | 308.8 MHz |
| 8+2 | 10 | 25 | 34.0 MHz | 77.3 MHz |
| 8+5 | 10+1 | 20 | 43.3 MHz | 78.7 MHz |
| 9+3 | 10+1 | 42 | 40.5 MHz | 154.6 MHz |

Fanout of device = 11
New data rate = (Optimal fanout/fanout of device) × Optimal fanout data rate
1 spatial light modulator 2048 × 1152
128 data pins As can be seen from above, using one clearable bit effectively cuts the data rate in half for both 8 and 9 effective bits. Using a second clearable bit reduces the data rate by almost another factor of 2. It should be noted that if the device had a fanout of 16, 8 effective bits using 1 clearable bit would have the same data rate as if the device had been fabricated for 8 bits of intensity. The optimal fanout for 7 integral bits and 1 clearable bit would be $2^7-1+1$, or 128, divided by 8, which is 16. Additionally, if the device had a fanout of 14, the data rate for 9 effective bits using 7 integral bits and 2 clearable bits would be the same as if the device had been fabricated with a fanout for 9 bits.

The ability to use the reduced memory requirements and data rate relationships of multiplexed memory architecture keeps the costs of a system down, and allows high-speed operation. Additionally, using multiplexed memory architecture makes the average data rate approach or equal to the peak data rate, and therefore doesn't require expensive, high-speed processors. However, the limitation of multiplexed memory architecture is based upon its fanout being tied to a certain number of bits of intensity.

As described above, using the extra memory cell, while doubling the memory requirements, in conjunction with a loading scheme as indicated above will allow devices with set fanout to be used with applications requiring different levels of intensity. The doubling of the memory requirements is not a large problem, since multiplexed memory architecture reduces the memory requirements of a one memory cell per pixel array by a factor of four. Therefore, even with the increase memory requirements, the devices remains well under what it would have been in a one memory cell per pixel system.

Thus, although there has been described to this point particular embodiments of an adapted multiplexed memory architecture spatial light modulator, it is not intended that such specific references be considered as limitations upon the scope of this invention except in-so-far as set forth in the following claims.

What is claimed is:

1. A spatial light modulator with improved data loading, comprising:

a. an array of individually addressable pixels, each pixel consisting of:
   i. an active area; and
   ii. activation circuitry, where said activation circuitry receives data, said data causing said active area to assume one of two states;

b. memory cells in electrical connection with said pixels, wherein at least two unique pixels are in dedicated connection with each one of each memory cell;

c. additional circuitry between said memory cell and said pixels such that said additional circuitry receives said data from a memory cell before said activation circuitry and allows said memory cell to receive new data, wherein said additional circuitry is capable of receiving independent control signals.

2. The modulator of claim 1 wherein said pixels are digital mirror devices.

3. The modulator of claim 1 wherein said pixels are liquid crystal cells.

4. The modulator of claim 1 wherein said pixels are actuated mirror arrays.

5. The modulator of claim 1 wherein said activation circuitry is at least one electrode.

6. The modulator of claim 1 wherein said additional circuitry is a data latch.

7. A method for improved data loading of a spatial light modulator, comprising:

a. sending a first data signal to an array of first memory cells, wherein each said first memory cell is assigned at least two unique, individually addressable pixels of said spatial light modulator;

b. receiving said first data signal at said array of first memory cells;

c. sending a transfer control signal to said array of first memory cells causing each of said first memory cells to transfer said first data signal to a second memory cell;

d. sending said first data signal from said second memory cell to activation circuitry in each of said pixels;

e. sending a second control signal causing said pixels to respond to said first data signal;

f. selectively sending a third control signal, causing selected ones of said pixels to stop responding to said first data signal, while receiving a second data signal at each of said first memory cells of said selective ones of said pixels.

* * * * *